Nov. 25, 1969 A. E. SILER 3,480,964

STRUCTURE FOR ASSEMBLING ANNULAR TENSIONED RECORDING DISCS

Filed Feb. 9, 1967

INVENTOR.
ALBERT E. SILER
BY Robert G. Rogers
ATTORNEY

United States Patent Office 3,480,964
Patented Nov. 25, 1969

3,480,964

STRUCTURE FOR ASSEMBLING ANNULAR TENSIONED RECORDING DISCS

Albert E. Siler, Fullerton, Calif., assignor to North American Rockwell Corporation, a corporation of Delaware Filed Feb. 9, 1967, Ser. No. 614,835
Int. Cl. G01d *15/12;* G11b *5/82*
U.S. Cl. 346—74 3 Claims

ABSTRACT OF THE DISCLOSURE

Structure and process for assembling annularly tensioned recording discs inside a thin walled cylindrical enclosure. The outer rims of the discs are provided with circumferentially extending and continuous grooves which are held in position adjacent to and facing circumferentially extending grooves in the cylindrical enclosure while a hardenable filler or adhesive material is forced into the grooves under pressure and hardened. The grooves form a common cavity between the discs and the enclosure. The process is repeated for each disc until the plurality of discs is assembled.

BACKGROUND OF THE INVENTION

Field of the invention

The invention relates to structure and a process for assembling a plurality of annularly tensioned recording discs and, more particularly, to such a process wherein a hardenable material interconnects grooves in the discs with grooves in an enclosing cylinder for holding the discs in position.

Description of prior art

Although no specific patents are known to teach or show the process described herein, several processes are in current use for assembling discs.

In one process, the rims of the discs are stacked together so that when all the discs are in place and bonded together, a continuous enclosure results. The joined assembly may then be connected to a motor and rotated relative to transducers. The difficulty with the stacking process is that the width dimensions of the rims cannot be exactly maintained. As a result, if the dimensions of all the rims vary in the same directions, it would be possible for the top disc to be positioned at an angle or displaced axially with respect to its desired location.

In other processes, screws or metal connectors may be used to simultaneously engage the rims of the discs and the walls of a thin metal enclosure. However, it is difficult to prevent reduction of the tension on the disc and maintain the disc in radial and axial alignment by using the above process. Also, the connectors have a tendency to become disengaged after the system has been subjected to normal environmental conditions.

Desirably, a process should interconnect discs in such a manner for providing positive locking of the discs to structures relative to each disc. The final assembly should be symmetrical about the axis of rotation and the tension on the disc should be unimpaired after an assembly. In addition, a preferred process is one in which the discs are assembled in a relatively short time.

SUMMARY OF THE INVENTION

Briefly, the invention comprises a process for assembling discs symmetrically about a rotational axis. Circumferentially, or annular, disposed grooves are formed in the outer rims of the discs. Similar annular grooves are formed at spaced intervals along the longitudinal axis of the cylinder which encloses the disc. The discs are under annular and radial tension.

Spaced apart holes are formed in the grooves at intervals about the circumference of said cylinder so that adhesive, setting or filler materials can be innjected into the adjacent portions of grooves of the disc and the cylinder. In a preferred embodiment, the holes are alternately used as injection orifices and vents. After the grooves are filled with the adhesive, or setting agent, it is hardened or cured so that the disc is secured in the desired position. Subsequently, the process is successively repeated until all the discs are assembled inside the cylinder.

Therefore, it is an object of this invention to provide a process for positively securing tensioned discs to thin walled enclosures, and for maintaining even tension around the discs.

It is still another object of this invention to symmetrically assemble parallel discs about a rotational axis.

Still another object of this invention is to provide a process for symmetrically assembling a plurality of relatively thin annular tensioned discs without reducing tension in the discs.

Still another object of this invention is to provide a process for symmetrically assembling discs within a cylindrical enclosure using grooved structures filled with adhesives for interconnecting the discs to the enclosure.

A still further object of this invention is to provide structure in which grooves in both the outer rims of recording discs and an enclosure, form a cavity which is common to both members and which is at least partially filled with a hardened material to hold the structures in a desired relative position.

These and other objects of this invention will become more apparent in connection with the following drawings.

DESCRIPTION OF THE PREFERRED EMBODIMENTS

Figure 1:
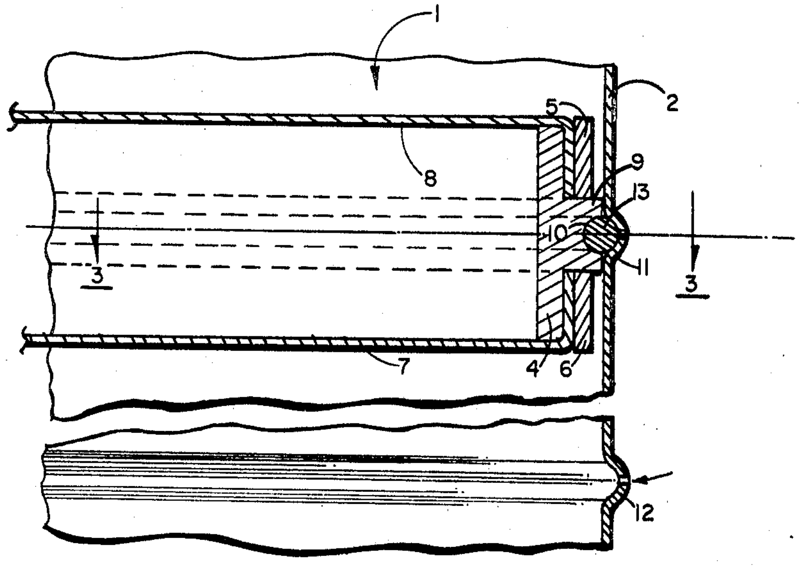
FIGURE 1 illustrates one embodiment of a disc having a grooved rim and a cylindrical enclosure having a complementary grooved portion.

FIGURE 1 shows dual disc member 1 which is connected to cylindrical enclosure 2 by hardened material. Circumferential rim 4 of the disc may be comprised of a relatively rigid material such as aluminum, steel, beryllium, and includes band members 5 and 6 which press over the edges of rim 4 and secure the magnetic recording sheets 7 and 8 to the rim under tension. The rim also includes rigid portion 9 which includes circumferentially, or annular, extending groove 10.

Cylindrical enclosure 2 also includes circumferentially extending grooves 11. The grooves of the enclosure project in the opposite direction from the grooves of the rim and in effect compliment the grooves of the rims. Another adjacent groove 12 is also shown. A plurality of such grooves are provided in the cylinder wall at spaced intervals along the longitudinal axis of the cylinder for accommodating a plurality of discs assembled inside the cylinder. Hardened material 13 is shown in the grooves.

Grooves, for example, may have a diameter of $\frac{1}{16}$ of an inch and may be formed in various configurations. For the present embodiment, the grooves are circular in appearance. The external diameter of the disc approximately matches the internal diameter of the cylinder so that the edges of the surfaces adjacent to the grooves are in approximte contact. As a result, a cavity is formed which is common to both the disc and the enclosure. When the cavity is filled, the two structures are connected together and secured in the desired relative positions.

The enclosure may be comprised of a thin material such as aluminum, steel, or other materials which have a suitable thermal co-efficient of expansion. In other words, the so-efficient of expansion of the rims and the cylindrical enclosure must be considered together so that expansion by one member will not impair the functional capabilities of the other.

The grooves of the cylinder include spaced apart holes or perforations 12 which permit a nozzle to insert adhesive materials inside the grooves. Alternate holes are used as a pressure vent to permit the adhesive to flow smoothly inside the grooves.

Figure 3:
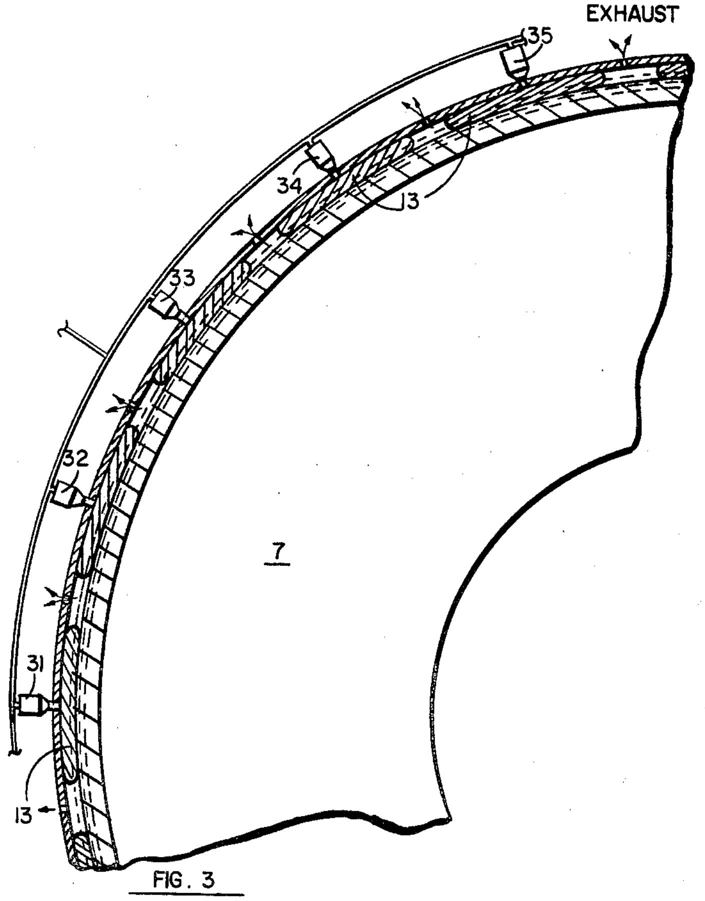
FIGURE 3 illustrates a top cross-sectional view of a cylinder enclosing a disc including nozzle means for injecting a hardenable material into the grooves of the members.

A typical enclosure as shown in FIGURE 3, may have a diameter of 21 inches. In that type of embodiment, the holes may be spaced 2 or 3 inches apart around the circumference of the enclosure. Nozzles 31, 32, 33, 34 and 35 are inserted into alternate ones of said holes so that material 13 may be simultaneously inserted into the grooves. The material is shown in a liquid state although in FIGURE 1, the material is in a hardened state. The hole spacing, and the number of nozzles used inserting the material into the grooves, is a function of the diameter of the grooves, viscosity of the material in its unhardened state, the desired degree of continuity of the material in the grooves, and the clearance between the circumference of the rim and the inner surface of the cylinder. However, the degree of actual displacement between the grooves of the rims and the grooves of the cylinder may also effect the number of nozzles and the hole spacing. In other words, if the grooves are substantially displaced, it may become more difficult to force the material into the grooves of the rims.

Various materials may be used in practicing the invention. For example, thermoplastics such as nylon, cellulose, etc., may be used. In addition, an epoxy including a catalyst may be used. Depending on the type of material used and the type of catalyst, the material can be cured at room temperature and can become hardened, for example, five minutes after being inserted. It may be necessary to subject the material to a temperature in order to achieve curing within a desirable period after the material has been inserted inside the grooves. However, various processes may be used in hardening the material. For example, certain materials may be injected hot and allowed to solidify when cooled. Others as indicated, must be subjected to a temperature in order to cure, or harden, the material.

The grooves in the rims may be formed by turning the material on a lathe. They could also be formed when the rims are molded. The enclosure grooves can be formed by rolling the material of the enclosure between a roller and a surface which mates with the roller. The longitudinal separation of the cylindrical grooves depends on the spacing required between the discs. Other processes known in the art may also be used to form the grooves depending on the type and thicknesses of the materials involved.

Figure 2:
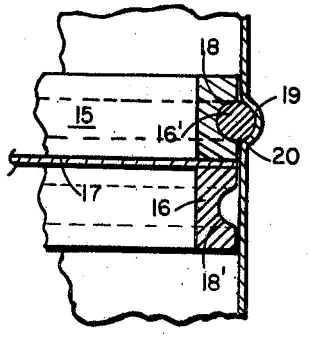
FIGURE 2 illustrates a second embodiment of grooves in the rim of a disc adjacent to grooves in the enclosing cylinder.

In assembling the discs, a first disc is placed inside the enclosure so that the grooves of the rim and enclosure are approximately adjacent to each other. The grooves may not be in exact alignment due to individual part tolerances. In that case, a portion of the grooves are adjacent to each other. Tolerances are taken into consideration when forming the grooves so that a complete or extreme displacement is avoided. The disc may be held in position by placing the disc on a support, or positioning, member which has a smaller diameter than the diameter of the cylinder. A plurality of nozzles are inserted in the alternate openings of the cylindrical grooves as shown in FIGURE 2 and an adhesive is forced under pressure into the grooves. When the adhesive is detected at the exhaust ports (alternate openings) the flow of adhesive is discontinued. After the inserted material has hardened, a second disc is inserted into the cylinder in a manner similar to that previously described so that the grooves of the rim mate with the next succeeding grooves of the enclosure. The system is repeated until all the discs have been assembled.

FIGURE 2 shows a second embodiment of a disc assembled inside a cylinder. The FIGURE 1 embodiment utilized dual disc recording surfaces. As shown in FIGURE 2, it is not necessary to use dual discs. Discs having a single recording surface may be used. Rim 15 is divided into sections 16 and 16'. The disc recording material 17 is secured between sections such as by bonding the material to the sections. The rims may be compressed before the material is bonded so that when released, the material is held under tension. Hardened material 20 is inside the groove.

Grooves 18 and 18' are provided in the sections although only one groove is used in the assembly. The enclosure is also provided with groove 19. The assembly processes have been previously described in connection with FIGURE 1. Although dual discs and single disc embodiments have been shown, the particular embodiments shown are not intended to limit the scope of the invention. Other rims and enclosures with different grooves may also be provided. For example, instead of two grooves in the FIGURE 2 embodiment, each section would be provided with one-half grooves so that when the two sections are bonded together a single groove would result. Other embodiments are also possible.

Although the invention has been described and illustrated in detail, it is to be understood that the same is by way of illustration and example only, and is not to be taken by way of limitation; the spirit and scope of this invention being limited only by the terms of the appended claims.

I claim:

1. An assembly of a plurality of recording discs inside an enclosure comprising, a plurality of recording discs, each of said plurality of recording discs including a rim in which is provided a groove, an enclosure for said plurality of recording discs, said enclosure having a plurality of grooves, each of said grooves being positioned adjacent to the grooves of different ones of said pluralities of recording discs for forming cavities which are common to the enclosure and the adjacent disc, hardened material disposed inside said cavities for holding said plurality of recording discs in a desired position relative to each other inside the enclosure.

2. The combination recited in claim 1 wherein said rim comprises an inner ring having a raised and centrally disposed edge in which is formed a groove, and two outer rings disposed about said inner ring on both sides of said edge, and further wherein each of said discs includes two magnetic recording sheets having their outer edges secured between said inner ring and said outer ring for forming a recording disc.

3. The combination recited in claim 1 wherein said rim comprises two rings, at least one of which includes said grooves, and a magnetic recording sheet having its outer edge secured between said rings for forming a recording disc.

References Cited

UNITED STATES PATENTS

| | | | |
|---|---|---|---|
| 2,686,091 | 8/1954 | Young | 156—294 |
| 3,359,549 | 12/1967 | Farrand | 340—174.1 |
| 3,373,413 | 3/1968 | Treseder | 340—174.1 |

BERNARD KONICK, Primary Examiner

GARY M. HOFFMAN, Assistant Examiner

U.S. Cl. X.R.

29—474.4; 156—294; 340—174.1; 346—137